United States Patent [19]

Rolf

[11] Patent Number: 5,142,817
[45] Date of Patent: Sep. 1, 1992

[54] PROTECTIVE WRAP FOR TREES AND OTHER PLANTS

[75] Inventor: David Rolf, Minneapolis, Minn.

[73] Assignee: Lec Tec Corporation, Minnetonka, Minn.

[21] Appl. No.: 639,577

[22] Filed: Jan. 9, 1991

[51] Int. Cl.[5] .......................................... A01G 17/12
[52] U.S. Cl. ....................................................... 47/24
[58] Field of Search ............................ 47/24, 23, 25; 106/15.05; 424/16, 17

[56] References Cited

U.S. PATENT DOCUMENTS

| | | | |
|---|---|---|---|
| 2,593,781 | 4/1952 | Meis | 47/24 |
| 2,947,111 | 8/1960 | Zobrist | 47/24 |
| 3,068,087 | 12/1962 | Davis | 47/24 |
| 3,333,361 | 8/1967 | Manak | 47/23 |
| 3,592,910 | 7/1971 | Clark | 424/300 |
| 3,864,114 | 2/1975 | Green | 47/24 |
| 4,299,818 | 11/1981 | Vite | 424/84 |
| 4,734,281 | 3/1988 | Yamamoto | 424/408 |
| 4,766,695 | 8/1988 | Harlow | 47/24 |

FOREIGN PATENT DOCUMENTS

| | | |
|---|---|---|
| 0367140 | 5/1990 | European Pat. Off. |
| 61-195634 | 8/1986 | Japan |
| 61-260828 | 11/1986 | Japan |
| 63-238001 | 10/1988 | Japan |

*Primary Examiner*—David A. Scherbel
*Assistant Examiner*—Michele A. Van Patton
*Attorney, Agent, or Firm*—James V. Harmon

[57] ABSTRACT

The invention provides a protective wrap for plants, such as trees, shrubs or flowering plants, comprising a flexible tape backing composed of a water insoluble polymeric sheet suited for being wound into a roll or dispensed as cut sheets. To the backing is applied a homogeneous, hydrophilic, stable matrix. The matrix is hydratable by atmospheric moisture, has a bonding surface which conforms to the contours of the plant, and is sufficiently tacky to hold the tape in place after being wrapped around the plant. The matrix includes a) a liquid phase comprising a non-aqueous polar organic water miscible liquid for plasticizing the matrix, b) a water soluble or water swellable hydrophilic film-forming polymer uniformly admixed with said liquid to form a flexible matrix, and c) a biologically active composition dispersed in the matrix. The matrix serves as a reservoir which is easily hydrated and will swell in a humid environment for carrying the biologically active protective composition from the reservoir toward the surface of the wrap where it can be released to the environment so as to provide controlled release of the protective agency for guarding the plant.

14 Claims, 1 Drawing Sheet

PROTECTIVE WRAP FOR TREES AND OTHER PLANTS

FIELD OF THE INVENTION

The present invention relates to plant protection and more particularly to protective material in sheet form which contains a biologically active composition for protecting plants.

BACKGROUND OF THE INVENTION

Many compositions have been in commercial use for protecting trees and shrubs. The paste type which has to be put on the plant by means of a spatula or brush is time-consuming to apply, may be washed away over time and has other disadvantages. For example, coating thickness will vary so that results are inconsistent. Moreover, paste compositions do not usually have reliable light-reflecting properties for protecting the plant from what is known as sun scald. The present invention is concerned with the provision of a protective wrap in sheet form to be supplied either as cut sheets or in rolls which can be wrapped onto a plant, e.g. around a stem or trunk, or otherwise applied to the surface of the plant.

U.S. Pat. No. 4,766,695 describes a tape for banding trees which comprises a film such as polyethylene coated with an elastomeric adhesive on one side. On the other side is a separate coating which is toxic to insects. One objective of the present invention is to provide a protective wrap in sheet form wherein all active constituents are contained in a single pressure-sensitive, i.e. tacky, coating which bonds the wrap to the plant and also contains a biolgically active protective composition such a deer, rodent or insect repellant.

It has been proposed, for example in European patent application 0 367 140 A2, to disperse a repellant, e.g., a flea repellant, in a water insoluble copolymer such as ethylene/vinyl acetate copolymer for making a dog collar in which the copolymer serves both as a carrier for an insect repellant and a sheet of material which forms the collar. By contrast, it is an object of the present invention to employ a strong, flexible backing in sheet form to provide structural strength and to give the protective wrap its shape, allowing it to be supplied in a sheet or roll form together with a separate hydrophilic matrix which serves as a reservoir for a biologically active protective composition.

A tree wrap has been available in sheet form with a sticky gum-based adhesive on one surface for bonding the wrap to the plant. While useful for preventing sun scald, no biologically active protective composition was present. As a result, the tape afforded no protection against deer, rodents, insects and other pests. Therefore, it is a general objective of the invention to furnish a protective wrap for plants which can be provided either as cut sheets or in the form of a roll in which a biologically active protective agency is molecularly dispersed within a flexible hydrophilic layer applied to a tape backing and adapted to swell upon being exposed to atmospheric moisture for releasing the protective agency into the environment to thereby provide controlled release for the protective agency, either onto the surface of the plant or onto the outside surface of the tape.

These and other more detailed and specific objects of the invention will be apparent in view of the following specification which illustrates by way of example but a few of the various forms of the present invention that will be apparent to those skilled in the art within the scope of the appended claims.

SUMMARY OF THE INVENTION

The invention provides a protective wrap for plants, such as trees, shrubs or flowering plants, comprising a flexible tape backing composed of a water insoluble polymeric sheet suited for being wound into a roll or dispensed as cut sheets. To the backing is applied a homogeneous, hydrophilic, stable matrix. The matrix is hydratable by atmospheric moisture, has a bonding surface which conforms to the contours of the plant, and is sufficiently tacky to hold the tape in place after being wrapped around the plant. The matrix includes a) a liquid phase comprising a non-aqueous polar organic water miscible liquid for plasticizing the matrix, b) a water soluble or water swellable hydrophilic film-forming polymer uniformly admixed with said liquid to form a flexible matrix, and c) a biologically active composition dispersed in the matrix. Thus, the matrix serves as a reservoir which is easily hydrated and will swell in a humid environment for carrying the biologically active protective composition from the reservoir toward the surface of the wrap where it can be released to the environment so as to provide controlled release of the protective agency for guarding the plant.

A preferred water miscible liquid plasticizer is a polyhydric alcohol. The film-former can comprise a natural or synthetic gum or other water soluble or swellable polymer. The matrix is preferably applied to the inside surface of the tape. In a moist environment, it carries the biologically active protective composition either to the inside or to the outside surface of the tape as the tape becomes hydrated.

The protective composition can be any composition adapted to ward off or kill pests such as deer, rodents, insects, slugs or the like. The tape can, if desired, have a reflective outer surface, e.g. by being metallized, or can be provided with a whitener such as $TiO_2$ or ZnO to reflect light for preventing sun scald. Preferably, a release coating is applied to the outer surface of the tape to enable the tape to be reliably unwound.

THE FIGURES

FIG. 1 is a perspective view of one form of protective wrap in accordance with the invention, namely, a strip of tape wound into a roll with the cut end of the tape greatly magnified; and FIG. 2 is a side view of a sapling wrapped with two pieces of protective tape in accordance with the invention.

DESCRIPTION OF THE PREFERRED EMBODIMENTS

Figure 1:
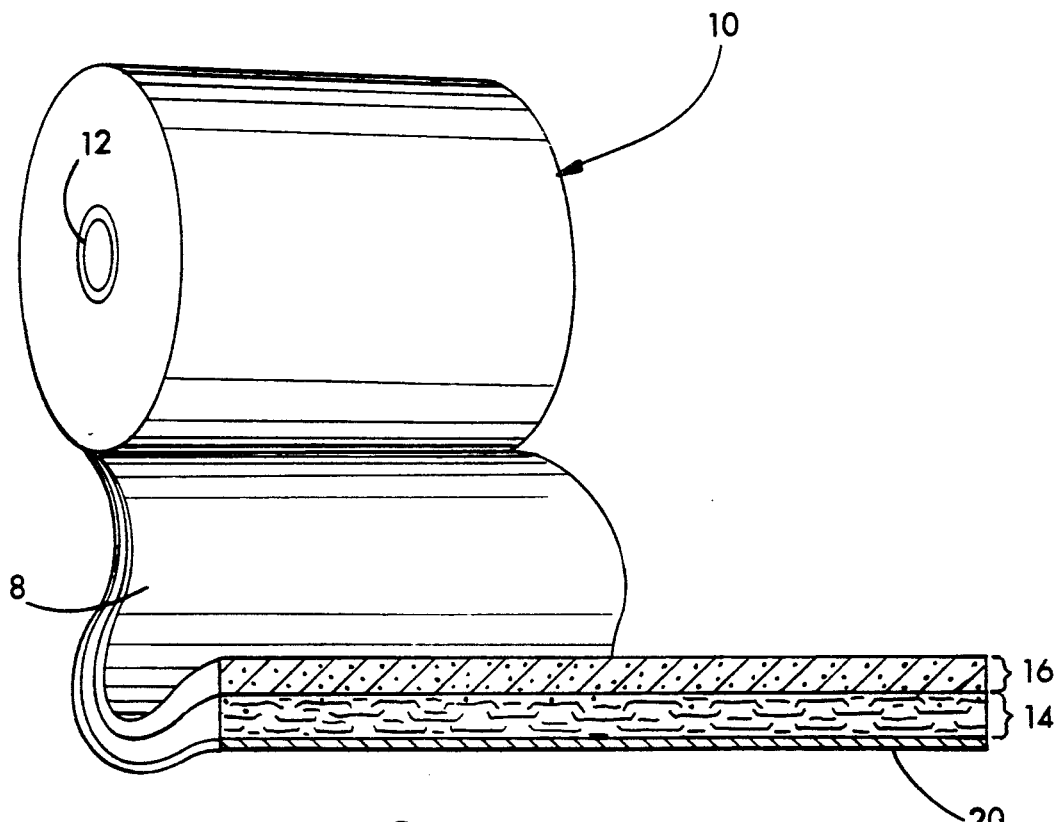
Figure 2:
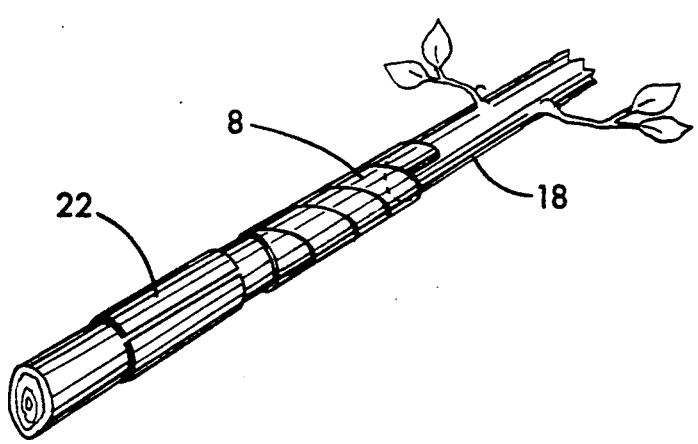

In FIG. 1 is shown a strip of tape 8 wound into a roll 10 on a core 12. The tape 8 includes a backing 14 formed from a porous, polymeric, water-insoluble material, e.g. a strip of nonwoven fabric composed of cellulose or polyester fibers or both. Applied to this backing 14 is a matrix 16 in the form of a gel coating that is hydratable by atmospheric moisture and is sufficiently sticky to bond the tape to a plant such as a sapling 18 (FIG. 2) when the tape strip 8 is applied to the plant 18. The tape can also include a release coating 20 on its outer surface to aid in unwinding the tape from the roll 10. The tape, instead of being provided in the form of a strip 8, can also be provided as a cut sheet 22 (FIG. 2), usually of rectangular form which can be applied to any part of a plant as required. It will be seen that the hydrated matrix 16 covers the entire inside surface of the tape backing 14. The release coating 20 can be any suitable known release coating, such as a silicone coating as described for example in U.S. Pat. No. 4,696,854, for preventing the blocking of tape when wound into rolls.

The backing 14 can comprise any of a variety of stable, water insoluble sheet materials such as nonwoven fabric, paper, porous plastic film, or the like. One preferred backing comprises a 10 mil. strip of nonwoven fabric comprising a mixture of cellulose fibers derived from wood pulp and polyester fibers. The fibers are assembled loosely into the backing to maintain porosity. If desired, a unifying or sizing resin can be applied to hold the fibers together. More specifically, in one preferred backing, a nonwoven fabric is used, such as a wet-lay cellulosic, polyester nonwoven fabric.

In another embodiment of the invention, the backing 14 comprises a 10 mil. porous kraft paper composed of cellulosic fibers saturated with a wet strength resin such as an acrylic binder. In another form of the invention, the backing 14 comprises an open-celled foam plastic strip composed a foam open-cell polyvinyl acetate resin. The backing 14 can also comprise cotton fabric or a synthetic fabric. Suitable synthetic fabrics include nylon or polyester. In any event, the backing 14 is preferably pervious to air to permit at least partial penetration of the matrix 16 into the surface thereof. From this it can be seen that the backing 14 comprises a flexible tape composed of a water insoluble polymeric sheet that can be wound into a roll 10 as in FIG. 1 or dispensed as a cut sheet 22. The tape backing 14 is preferably composed of either a porous, fibrous composition or a porous, flexible plastic resinous sheet.

The composition of the hydrophilic matrix 16 will now be described. It is stable before use in the sense that it does not flow while on a roll. One important feature of the matrix 16 is that, when applied, it conforms to the contours of the surface of the plant 18 and also provides hydrophilic adhesive properties which enhance adhesion to the surface of the plant 18. The matrix 16 will also absorbs moisture from the atmosphere which makes it become tackier as it weathers. In addition, it serves as a reservoir for the controlled release of the protective composition as will be described further below.

The matrix 16 is formed from a solid film-forming phase comprising any naturally occurring or synthetic hydrophilic water dispersible, swellable or soluble polymer such as gum karaya, guar gum, gum acacia, pregelatinized starch, carboxypropylcellulose, carboxymethylcellulose, hydroxypropylcellulose, locust bean gum, carrageenan, gum tragacanth or other polysaccharide gums. The film-forming part of the matrix can also be formed from synthetic polymers such as polyacrylamide, polymethacrylamide, polmethacrylic acid, polyacrylic acid and their cogeners, polyvinylalcohol or polyoxyethylene.

The matrix 16 also includes a liquid phase. The liquid phase comprises any suitable nonaqueous polar organic and water-miscible liquid for plasticizing the film-former of the matrix. Examples of suitable liquids include polyhydric alcohols such as glycerol, polypropyleneglycol, polyethyleneglycol, a solution of 70% sorbitol and 30% water, ethyleneglycol monoethylether, triethyleneglycol and 1,3 propane diol. When polyhydric alcohol is used, it is preferably used in an amount between about 10 percent and 65 percent by weight of the matrix. All quantities herein are expressed by weight.

The finished matrix 16 is somewhat elastic, flexible and hydrophilic. The surface is slightly tacky to the touch and typically has a thickness of about 0.008 inch. In one product, the matrix 16 was applied at a basis weight of 130 pounds per ream (3,000 square feet). The matrix 16 can be applied with a knife coater or by reverse roll coating.

The matrix 16 serves as a reservoir for an agency to repel or kill pests or in some other way protect the plant 18. During use, the protective composition is released to the surface of the tape 8 and to the surface of the plant 18 to which the tape 8 is applied.

The protective composition is molecularly dispersed in the matrix 16. The protective composition can include any rodent repellant or rodenticide, insecticide or insect repellant, fungicide, deer or herbivore repellant, or invertebrate repellant or toxic agent. It can also include substances in the nature of a hormonal agency such as a pheromone for attracting or repelling animal life. If an insect is beneficial to the plant 18, a pheromone can be used for attracting a particular species which is a predator to another that causes damage to the plant 18. Because the matrix 16 is hydratable, the protective agency is more readily available and thus is more biologically active than when contained in a hydrophobic coating, e.g. rubber-based adhesive.

Among suitable biologically active repellants are hot pepper extract; capsiacin; thiram (tetramethyl thiram disulfide) which is especially useful for deer, rabbits, squirrels and mice; benzyldiethyl [(2,6,xylyl carbonyl) methyl] ammonium saccharide which is particularly useful for dogs, cats, raccoons, rabbits, mice and deer; thymol; denatonium saccharide which is very bitter; pyrethrosin; pyrethrins from chrysanthemum flowers as an insecticide; pyrethrolone; chrysanthemic acid and other insecticides; and a fungicide such as a 2-(4-thiazolyl) benzimidazole hypophosphite type fungicide available from Merck and Company of Rahway, N.J. To reduce gypsy moth infection, Bacillus thuringiensis can be employed.

Among the biologically active attractants that can be used are pheromones, i.e., chemical hormone-like substances which allow animal life to communicate at a distance. Some act as alarm markers. Others act as territory markers or sex attractants. Among these are allomones and kairomones which serve as interspecific chemical messengers. These substances can cause a powerful reaction in the organism secreting them or receiving them, and can be nonadaptive or detrimental to organisms producing them.

To prevent the penetration of light, reflective materials or whiteners such as ZnO or $TiO_2$ in an amount that is biologically effective for protecting the plant from sun scald can be incorporated into the matrix 16 or, if desired, in the alternative applied to the back of the tape. If desired, a metallized plastic strip can also be incorporated into the back of the tape 8 at 20 to reflect sunlight for the prevention of sun scald.

The polar liquid phase of the matrix 16 causes the matrix to be hydratable by atmospheric moisture and also gives the matrix 16 a bonding surface which will conform to the contours of the plant and makes the tape 8 sufficiently tacky, i.e. pressure-sensitive, to hold the tape 8 in place after being wrapped around the plant 18.

In addition, since the matrix 16 is a hydrophilic gel, it will swell in a humid environment so as to carry the biologically active protective composition from the matrix 16 which acts as a reservoir toward the surface of the wrap where it can be more readily released to the environment, thereby providing controlled release of the protective composition to guard the plant 18 from pests. If the matrix 16 is only on the inside of the tape 8, it can migrate through the backing 14 during moist weather to the outside of the tape 8 when it becomes hydrated, carrying the biologically active protective composition with it. Moreover, moisture in the atmosphere also enhances the adhesive bond between the wrap and the plant 18.

The effect of varying constituents in the matrix 16 will now be described. The polyhydric alcohol or other liquid should be present in an amount between 25 percent to 65 percent. Its effect is to swell the hydrophilic polymer and help to dissolve the biologically active material. It is also involved in hydrogen bonding and cross linking. Too much tends to make the product mushy, runny, soft or greasy feeling, and too little causes the product to be hard, dry and usually less tacky. The liquid phase also acts as a humectant. Propylene glycol is a less effective hydrating substance than glycerin.

The amount of hydrophilic polymer used can be varied from about 12 percent to 30 percent by weight. The hydrophilic polymer builds viscosity by hydrogen bonding, eventually becoming semi-solid. Excessive amounts cause the formula to become too thick and viscous to be coated evenly, and the product tends to be lumpy. However, if too little is used, the product may be soft, mushy or runny.

A water-dispersible tackifier or adhesive film agent can also be used. When present, it is preferably used in an amount from about 5 percent to 29 percent of the composition to add strength and/or tackiness. One example is anionic polyacrylamide, a copolymer of acrylamide and acrylic acid. This material is sold as Reten 521PX by Hercules Chemical Company of Wilmington, Del. If used in excess, the viscosity of the formula becomes excessive, unworkable and lumpy. If too little is used, the matrix may be soft or runny.

Another suitable water-dispersible tackifier is a copolymer of di-octylmaleate and vinyl acetate as an emulsion containing about 50 percent water. This product is sold under the name Flexbond 150 by the Air Products Company of Allentown, Pa. A similar emulsion copolymer adhesive is available from the H. B. Fuller Company of St. Paul, Minn., under the name PN 3120Z. These tackifying polymers, if present in excess, reduce pot life and cause the material to become too tacky. However, if too little is used, tack may be insufficient and the product may not adhere well to the backing.

Another suitable tackifying agent comprises an emulsion compound which is a polymer of acrylic esters having an approximate molecular weight of about 500,000 and is water dispersible. This can be obtained, for example, under the trade name Hycar 261761 from the B. F. Goodrich Company of Cleveland, Ohio, for imparting tackiness to the matrix when used in an amount of about 5 percent to 25 percent of the matrix.

Polyacrylic acid having a molecular weight of about 50,000 is available from Poly Sciences, Inc., Warrington, Pa. It assists in building viscosity by hydrogen bonding. Its low pH can be increased by adding caustic which will enhance its thickening properties. It is used in an amount of about 1 percent to 21 percent as a film former. It also helps in stabilizing the formulation. If too much is used, the matrix can become too viscous and unworkable or lumpy.

The entire strip of tape 8 is biodegradable. That is to say, both the adhesive matrix 16 and the tape backing 14 are biodegradable. In addition, the matrix 16 serves both as an adhesive as well as a reservoir for the biologically active ingredient. Since the backing 14 is porous, moisture will cause the matrix 16 and biologically active ingredient to migrate through the backing 14 to the outer surface of the tape 8 where it can be more effective. The whitener or metallized film makes the protective wrap more reflective and therefore provides better protection against sun scald. While a metallized film backing is not biodegradable, it provides excellent protection against solar heating in winter. The invention also provides a self-wound roll of tape which affords controlled release of the biologically active protective agent.

The invention will be better understood by reference to the following examples.

The matrices described below are applied by reverse roll coating to any of the following backings: 600 pound/ream wet-strength kraft paper, 23 pound/ream wet-lay non-woven fabric composed of cellulose and polyester fibers sold under the trademark N-7601 by the Dexter Paper Company of Windsor Locks, Conn., cotton fabric, polyester fabric, polypore foamed plastic sheet which is an open-cell foamed polyvinylchloride film, and 10 mil. non-porous polyethylene film. When the backing is porous, a release agent such as silicone is applied to the outside surface of the backing, for example as described in U.S. Pat. No. 4,696,854 which is incorporated herein by reference.

| | Ex. 1 | Ex. 2 | Ex. 3 | Ex. 4 |
|---|---|---|---|---|
| Glycerin | 52% | 56% | 57% | 55% |
| Karaya | 21% | 12% | 19% | 18% |
| $TiO_2$ | 5% | 5% | 0% | 0% |
| PN3120Z tackifier | 21% | 25% | 21% | 20% |
| Thiram | 1% | 0% | 0% | 7% |
| Thymol | 0% | 2% | 3% | 0% |

| | Ex. 5 | Ex. 6 | Ex. 7 |
|---|---|---|---|
| Glycerin | 57% | 51% | 48% |
| Karaya | 19% | 18% | 23% |
| $TiO_2$ | 0% | 4% | 0% |
| ZnO | 6% | 0% | 9% |
| PN3120Z tackifier | 5% | 18% | 19% |
| Thiram | 9% | 9% | 0% |
| Thymol | 4% | 0% | 1% |

| | Ex. 8 | Ex. 9 | Ex. 10 | Ex. 11 |
|---|---|---|---|---|
| Solution of 70% sorbitol and 30% water | 53% | 56% | 57% | 55% |
| Guar gum | 20% | 19% | 19% | 18% |
| $TiO_2$ | 5% | 2% | 0% | 0% |
| Flexbond 150 tackifier | 21% | 21% | 21% | 20% |
| Thiram | 1% | 0% | 0% | 7% |
| Denatonium benzoate | 0% | 2% | 3% | 0% |

| | Ex. 12 | Ex. 13 | Ex. 14 |
|---|---|---|---|
| Solution of 70% sorbitol and 30% water | 40% | 30% | 27% |
| Polyethylene glycol | 20% | 20% | 20% |
| Locust bean gum | 19% | 18% | 24% |
| $TiO_2$ | 0% | 5% | 0% |
| ZnO | 0% | 0% | 9% |
| Hycar 26171 tackifier | 9% | 18% | 19% |
| Hot pepper extract | 9% | 9% | 0% |
| Benzyl diethyl [(2,6 xylyl carbonyl) methyl] ammonium | 3% | 0% | 1% |

-continued saccharide

| | Ex. 15 | Ex. 16 | Ex. 17 | Ex. 18 |
|---|---|---|---|---|
| Glycerin | 33% | 45% | 40% | 40% |
| Triethylene glycol | 20% | 20% | 17% | 15% |
| Polyacrylamide | 20% | 19% | 19% | 18% |
| $TiO_2$ | 5% | 2% | 0% | 0% |
| PN3120Z tackifier | 21% | 12% | 21% | 20% |
| Thiram | 1% | 0% | 0% | 7% |
| Thymol | 0% | 2% | 3% | 0% |

| | Ex. 19 | Ex. 20 | Ex. 21 |
|---|---|---|---|
| Solution of 70% sorbitol and 30% water | 28% | 40% | 33% |
| 1,3 propane diol | 13% | 10% | 15% |
| Carboxymethylcellulose | 19% | 18% | 24% |
| $TiO_2$ | 2% | 4% | 0% |
| ZnO | 0% | 0% | 9% |
| Flexbond 150 tackifier | 29% | 18% | 19% |
| Thiram | 9% | 9% | 0% |
| Denatonium saccharide | 0% | 1% | 0% |

| | Ex. 22 | Ex. 23 | Ex. 24 |
|---|---|---|---|
| Solution of 70% sorbitol and 30% water | 33% | 30% | 18% |
| Polypropylene glycol | 20% | 20% | 20% |
| Polyvinyl alcohol | 19% | 18% | 24% |
| $TiO_2$ | 0% | 4% | 0% |
| ZnO | 0% | 0% | 9% |
| Flexbond 150 tackifier | 9% | 18% | 19% |
| Arbitech-20 fungicide | 9% | 9% | 1% |
| pyrethrosin | 10% | 1% | 9% |

| | Ex. 25 | Ex. 26 | Ex. 27 | Ex. 28 |
|---|---|---|---|---|
| Polyethylene glycol | 53% | 56% | 57% | 55% |
| Polyacrylic acid | 21% | 19% | 19% | 18% |
| $TiO_2$ | 4% | 2% | 3% | 0% |
| PN3120Z tackifier | 21% | 21% | 21% | 20% |
| Capsiacin | 1% | 2% | 0% | 7% |
| Gypsy moth pheromone* | 0.01% | 0.01% | 0.01% | 0.01% |

| | Ex. 29 | Ex. 30 | Ex. 31 |
|---|---|---|---|
| Polyethylene oxide | 53% | 51% | 42% |
| Polymethacrylic acid | 19% | 18% | 30% |
| $TiO_2$ | 0% | 4% | 0% |
| ZnO | 0% | 0% | 9% |
| PN3120Z tackifier | 19% | 18% | 19% |
| Capsicum | 9% | 9% | 0% |
| Gypsy moth pheromone* | 0.01% | 0.01% | 0.01% |

*In other samples, commercially available allomones and kairomones are used in place of the pheromones.

Many variations of the present invention within the scope of the appended claims will be apparent to those skilled in the art once the principles described above are understood.

What is claimed is:

1. A protective wrap for plants comprising, a flexible tape backing comprising,
   a flexible water insoluble polymeric sheet backing suited for being wound into rolls or dispensed as cut sheets,
   a homogeneous hydrophilic stable matrix applied to the backing, said matrix being hydratable by atmospheric moisture and having a bonding surface adapted to conform to the contours of the plant and being sufficiently tacky to hold the tape in place after being wrapped around the plant, said matrix including
   a) a liquid phase comprising a nonaqueous polar organic water-miscible liquid for plasticizing the matrix,
   b) a water-soluble or water-swellable natural or synthetic hydrophilic film-forming polymer uniformly admixed with said liquid to form a flexible reservoir, and
   c) a biologically active composition dispersed in the hydrophilic reservoir, said reservoir containing the biologically active composition being adapted to swell in a humid environment for carrying the biologically active composition from the reservoir toward a surface of the wrap where it can be released to the environment so as to provide controlled release of the protective composition for guarding the plant.

2. The protective wrap of claim 1 wherein the matrix is applied as a reservoir on an inside surface of said sheet backing, said backing is porous and upon exposure of said tape to atmospheric moisture, said matrix is adapted to migrate through the backing to an outside surface of the backing for carrying said biologically active composition to an outside surface of the backing.

3. The protective wrap for plants of claim 1 wherein the liquid phase comprises a polyhydric alcohol and the film-forming natural or synthetic polymer comprises a member selected from the group consisting of karaya gum, guar gum, locust bean gum, carboxymethylcellulose, polyacrylamide, polymethacrylamide and its cogeners, polyacrylic acid, polymethacrylic acid, polyoxyethylene and polyvinyl alcohol.

4. The protective wrap for plants of claim 1 wherein the biologically active composition comprises at least one member selected from the group consisting of hot pepper extract, capsiacin, thiram, benzyl diethyl [(2,6 xylyl carbonyl) methyl] ammonium saccharide, thymol, denatonium saccharide, pyrethrosin, pyrethrins, pyrethrolone, crysanthemic acid, Bacillus thuringiniesis, pheromones, allomones and kairomones.

5. The protective wrap for plants of claim 1 wherein a whitener is incorporated into the wrap for reflecting light to reduce sun scald.

6. The protective wrap of claim 5 wherein the whitener comprises ZnO or $TiO_2$ or a metallized member to reflect sunlight from said backing.

7. The protective wrap for plants of claim 1 wherein the protective composition comprises a member selected from the group consisting of a pesticide, fungicide, animal or insect attractant, animal or insect repellant and a pheromone.

8. The protective wrap of claim 1 wherein a fungicide is dispersed in the hydrophilic matrix.

9. A flexible, water absorbent protective wrap to be applied to the surface of a plant comprising, a flexible porous backing element selected from the group consisting of cotton fabric, paper, synthetic fabric, plastic and nonwoven fabric;

a tacky matrix attached to the backing comprising a homogeneous hydrophilic stable film having adhesive properties for adhesion to the surface of the plant and being sufficiently pliant to conform to the contours of the plant;

said matrix including a solid phase comprising about 12 percent to 30 percent of the total weight of the matrix and including a natural or synthetic hydratable polymeric resin selected from the group consisting of polyacrylic acid, polymethacrylic acid, polymethacrylamide, polyoxyethylene, polyvinyl alcohol, polyacrylamide and their cogeners, and a natural or synthetic carbohydrate polymer;

said matrix including a liquid phase comprising a polyhydric alcohol and comprising about 25 percent to 65 percent by weight of the matrix; and said matrix containing a biologically active protective composition selected from the group consisting of an insecticide or insect repellant, a fungicide, a rodenticide or rodent repellant, a herbivoricide or herbivore repellant, a pheromone and an attractant for animal life.

10. The protective wrap of claim 9 wherein a whitener is incorporated into the tape for increasing light reflection to enhance protection of the plant from sun scald.

11. The protective wrap of claim 9 wherein a metallized reflective means is provided in the tape for reflecting sunlight to protect the plant.

12. A protective wrap for plants comprising, a flexible tape backing comprising,
   a flexible water insoluble polymeric sheet backing suited for being wound into rolls or dispensed as cut sheets,
   a homogeneous hydrophilic stable matrix applied to the backing, said matrix being hydratable by atmospheric moisture and having a bonding surface adapted to conform to the contours of the plant and being sufficiently tacky to hold the tape in place after being wrapped around the plant, said matrix including
   a) a liquid phase comprising a nonaqueous polar organic water-miscible liquid for plasticizing the matrix,
   b) a water-soluble or water-swellable natural or synthetic hydrophilic film-forming polymer uniformly admixed with said liquid to form a flexible reservoir, and
   c) a whitener composition dispersed within the stable matrix in an amount that is biologically effective for enhancing the protection of the plant from damage due to sun scald and said matrix being swellable in a humid environment for carrying the biologically effective whitener toward a surface of the wrap.

13. The protective wrap of claim 12 wherein the whitener is a mineral whitener composition in finely divided form.

14. The protective wrap of claim 12 wherein a fungicide is dispersed in the stable hydrophilic matrix.

* * * * *